United States Patent
Nagasawa et al.

(10) Patent No.: US 9,731,676 B2
(45) Date of Patent: Aug. 15, 2017

(54) CURTAIN AIRBAG DEVICE

(71) Applicant: NIHON PLAST CO., LTD., Shizuoka (JP)

(72) Inventors: Yasunori Nagasawa, Shizuoka (JP); Takumi Yachi, Shizuoka (JP); Norimasa Goto, Shizuoka (JP)

(73) Assignee: Nihon Plast CO., Ltd., Fujinomiya-shi, Shizuoka (JP)

( * ) Notice: Subject to any disclaimer, the term of this patent is extended or adjusted under 35 U.S.C. 154(b) by 0 days.

(21) Appl. No.: 15/177,547

(22) Filed: Jun. 9, 2016

(65) Prior Publication Data

US 2016/0362081 A1 Dec. 15, 2016

(30) Foreign Application Priority Data

Jun. 9, 2015 (JP) .................................. 2015-116497
Mar. 24, 2016 (JP) .................................. 2016-059914

(51) Int. Cl.
*B60R 21/232* (2011.01)
*B60R 21/2346* (2011.01)

(52) U.S. Cl.
CPC ........ *B60R 21/232* (2013.01); *B60R 21/2346* (2013.01)

(58) Field of Classification Search
CPC ... B60R 21/233; B60R 21/232; B60R 21/239; B60R 21/23138; B60R 21/264; B60R 2021/23324
See application file for complete search history.

(56) References Cited

U.S. PATENT DOCUMENTS

| | | | | |
|---|---|---|---|---|
| 2003/0116947 A1* | 6/2003 | Yokoyama | ............ | B60R 21/201 280/730.2 |
| 2006/0071460 A1* | 4/2006 | Goto | ..................... | B60R 21/232 280/730.2 |
| 2008/0030011 A1* | 2/2008 | Ishikawa | ............. | B60R 21/2346 280/730.2 |
| 2010/0025971 A1* | 2/2010 | Steinbach | ............. | B60R 21/232 280/729 |
| 2012/0248751 A1 | 10/2012 | Kato et al. | | |
| 2016/0031404 A1* | 2/2016 | Takedomi | ........... | B60R 21/2334 280/729 |

FOREIGN PATENT DOCUMENTS

JP 2012-201312 A 10/2012

* cited by examiner

*Primary Examiner* — Darlene P Condra
(74) *Attorney, Agent, or Firm* — Brundidge & Stanger, P.C.

(57) ABSTRACT

A curtain airbag device of the present invention includes an airbag body including a bend-facilitating portion which is formed of a non-inflating portion of the airbag body in at least one chamber disposed at a lower end portion of the airbag body and which facilitates bending of the airbag body during inflation and deployment of the airbag body. In the curtain airbag device, the chamber including the bend-facilitating portion includes a passage for distributing the gas such that the gas comes around the bend-facilitating portion in one direction.

6 Claims, 6 Drawing Sheets

CURTAIN AIRBAG DEVICE

CROSS REFERENCE TO RELATED APPLICATION

This application is entitled to and claims the benefit of Japanese Patent Applications No. 2015-116497 filed on Jun. 9, 2015, and No. 2016-059914 filed on Mar. 24, 2016, the entire contents of which including the specifications, drawings and abstracts are incorporated herein by reference in their entirety.

TECHNICAL FIELD

The present invention relates to a curtain airbag device including an airbag which inflates and deploys along a side window portion of a vehicle body.

BACKGROUND ART

In recent years, the number of automobiles each provided with a curtain airbag device has been increasing. This curtain airbag device includes a curtain airbag which inflates and deploys along a side window portion of a vehicle body in the vehicle interior in order to protect the head of an occupant in vehicle accidents such as a side impact and a rollover.

Ordinarily, when an accident such as a side impact or rollover on a vehicle is detected or such an accident is predicted in the curtain airbag device an inflator generates an inflation gas and supplies the gas to the inside of the curtain airbag from the inflator, thereby, causing the curtain airbag to instantly inflate and deploy in the vehicle interior. Accordingly, the inflating portion of the curtain airbag protects the head of the occupant, thus ensuring the safety of the occupant.

Figure 10:
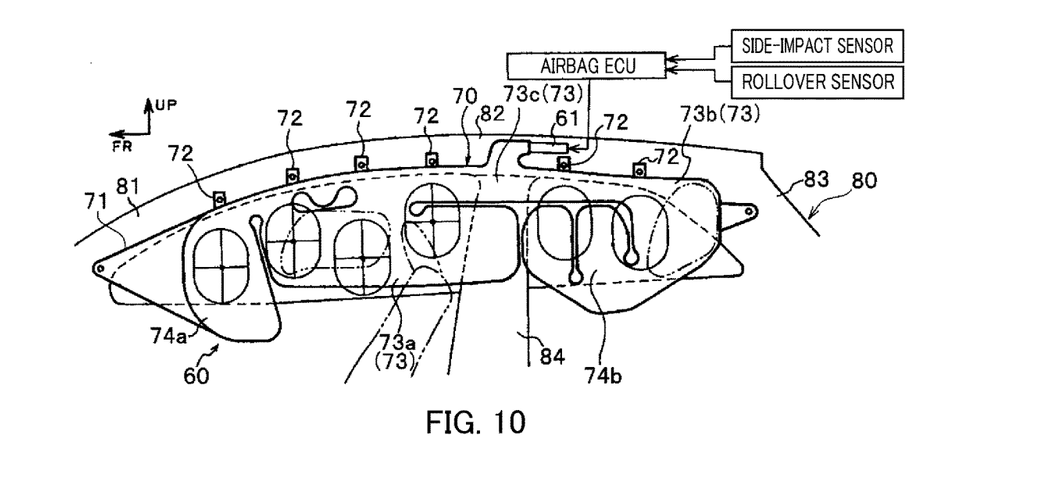
FIG. 10 is a side view of a curtain airbag according to the related art.

Japanese Patent Application Laid-open No. 2012-201312 (Patent Literature (hereinafter, referred to as "PTL") 1) discloses an invention relating to such a curtain airbag device. Curtain airbag device 60 disclosed in PTL 1 includes curtain airbag 70 and inflator 61 which generates a gas and supplies the gas to the inside of curtain airbag 70, as illustrated in FIG. 10.

Curtain airbag 70 in PTL 1 includes: airbag body 71 which is supplied with a gas and thus inflates; and a plurality of attachment pieces 72 attached to an upper end portion of airbag body 71. Curtain airbag 70 described above is fixed to vehicle body 80 using attachment pieces 72 each fixed to vehicle body 80 using a fixing member such as a bolt. Thus, airbag body 71 is housed in a state of being folded in a range extending from front pillar 81 to the vicinity of rear pillar 83 through roof-side portion 82 of vehicle body 80.

In addition, airbag body 71 of curtain airbag 70 includes: a main inflating portion (main chamber) 73 which inflates and deploys in the head protection area; and front and rear auxiliary inflating portions (second chambers) 74a and 74b in communication with main inflating portion 73 via a reduced-diameter portion. In addition, main inflating portion 73 includes: front main inflating portion 73a for front seat; rear main inflating portion 73b for rear seat; and gas supply passage 73c which serves as a gas passage communicating between front main inflating portion 73a and rear main inflating portion 73b along roof-side portion 82.

In curtain airbag 70 disclosed in PTL 1, in particular, front main inflating portion 73a of airbag body 71 is formed so as to deploy in a cylindrical shape extending in a vehicle longitudinal direction above the belt line (also referred to as "trim line") drawn by a lower edge of a side window, so as to overlap with center pillar 84 when viewed in a side view of the vehicle.

Front auxiliary inflating portion 74a is disposed so that the lower end portion of front auxiliary inflating portion 74a extends below the belt line and overlaps with the front side door in front of main inflating portion 73 in a side view of the vehicle when front auxiliary inflating portion 74a deploys. In addition, rear auxiliary inflating portion 74b is disposed so that the lower end portion of rear auxiliary inflating portion 74b extends below the belt line and overlaps with the rear side door under gas supply passage 73c between front main inflating portion 73a and rear main inflating portion 73b in a side view of the vehicle when rear auxiliary inflating portion 74b deploys.

According to PTL 1, in a side impact on a vehicle, main inflating portion 73 of curtain airbag device 60 deploys upon receiving a supply of gas, so that the head of an occupant can be protected from the side impact. Meanwhile, in a vehicle rollover, main inflating portion 73 and front and rear auxiliary inflating portions 74a and 74b deploy, so that the head of the occupant can be restricted from moving outward in the vehicle width direction within a broad range of the vehicle longitudinal direction.

In PTL 1, in particular, front main inflating portion 73a is supported by center pillar 84 and front and rear auxiliary inflating portions 74a and 74b are supported by the side door below the belt line in a rollover. Thus, the reaction force that restricts the head of the occupant from moving outward in the vehicle width direction can be effectively acquired, and the protection performance for the head of an occupant improves.

SUMMARY OF INVENTION

Technical Problem

In curtain airbag system 60 in PTL 1, airbag body 71 is formed so that the lower end portions of front and rear auxiliary inflating portions 74a and 74b extend below the belt line so as to overlap with the front and rear side doors, respectively, in a side view of the vehicle when airbag body 71 deploys. Thus, when airbag body 71 inflates and deploys due to a vehicle rollover or the like, front and rear auxiliary inflating portions 74a and 74b are supported by the side door below the belt line as described above, so that the reaction force is acquired. Thus, curtain airbag 70 can safely protect the head of an occupant and surely prevent the occupant from being thrown out of the vehicle.

However, when the curtain airbag (airbag body) is formed in such a large size that the curtain airbag extends beyond the belt line even when no gas is supplied to the inside of the curtain airbag, the fabric panels that form the airbag body inevitably increase in size. In order to cause such a large-size airbag body to inflate, an inflator having a large output needs to be used. As a result, increases in costs of the curtain airbag device and/or increases in weight and size of the curtain airbag device occur.

The present invention has been made in view of the problem with the related art and aims to provide a curtain airbag device which causes an inflating portion of an airbag body to extend below a belt line and to overlap with a side door (door trim) during inflation and deployment of the airbag body and which is reduced in size and/or weight.

Solution to Problem

In order to achieve the above mentioned object, a curtain airbag device to be provided by the present invention includes as a basic configuration: an inflator configured to generate a gas; and a curtain airbag to be attached along an upper edge of a side window portion of a vehicle body in a state where the curtain airbag is folded using a predetermined procedure. The curtain airbag includes an airbag body to be supplied with the gas from the inflator to inflate, and the airbag body inflates and deploys downward by generation of the gas so as to cover the side window portion on a vehicle interior side. The airbag body includes: a gas introduction portion for introducing the gas into the airbag body, a main passage portion communicating with the gas introduction portion for distributing the gas, and a plurality of chambers communicating with the main passage portion. The airbag body includes: a front inflating portion formed by at least one of the chambers and being inflatable and deployable so as to correspond to a position of the side window portion on a front side of the vehicle body, and a rear inflating portion formed by at least one of the chambers and being inflatable and deployable so as to correspond to a position of the side window portion on a rear side of the vehicle body. At least one of the chambers disposed at a lower end portion of the airbag body is provided with a bend-facilitating portion composed of a non-inflating portion of the airbag body and facilitating bending of the airbag body during inflation and deployment of the airbag body, the bend-facilitating portion is disposed so as to correspond to a position between front and rear end portions of the side window portion on the rear side in a front and rear direction of the vehicle body. And the chamber including the bend-facilitating portion includes a passage for distributing the gas such that the gas comes around the bend-facilitating portion in one direction.

In the curtain airbag device according to the present invention, the rear inflating portion preferably includes a lower edge disposed at a position identical to or above a lower end position of the side window portion on the rear side when the curtain airbag in a state of being attached to the vehicle body is spread without a supply of the gas, the lower edge deforming downward from the lower end position of the side window portion on the rear side by bending of the airbag body at the bend-facilitating portion serving as an origin during inflation and deployment of the airbag body.

In the curtain airbag device according to the present invention, the bend-facilitating portion is preferably provided by partially dividing, into an upper portion and a lower portion, the chamber which is to include the bend-facilitating portion.

In the curtain airbag device of the present invention, the bend-facilitating portion preferably includes a linear non-inflating portion formed by a sewing line for sewing, in a curved shape or linear shape, together fabric panels forming the airbag body, the linear non-inflating portion extending upward or obliquely-rear upward from a lower edge portion of an outer-peripheral non-inflating portion provided at an outer-peripheral portion of the airbag body.

Moreover, in the curtain airbag device of the present invention, the chamber disposed at the lower end portion and including the bend-facilitating portion communicates, via a throttle portion, with another chamber adjacent to the chamber.

In this case, the bend-facilitating portion is preferably disposed behind the throttle portion of the chamber in a front and rear direction of a vehicle.

In addition, the bend-facilitating portion is preferably disposed below the throttle portion of the chamber in an up and down direction of a vehicle.

Moreover, the chamber including the bend-facilitating portion preferably includes a lower end disposed so that a portion of the lower end which extends toward the throttle portion from the bend-facilitating portion serving as a boundary is positioned above the other portion of the lower end extending to a downstream side from the bend-facilitating portion.

Advantageous Effects of Invention

The airbag body in the curtain airbag of the curtain airbag device according to the present invention includes: the gas introduction portion for introducing a gas to the inside of the airbag body; the main passage portion communicating with the gas introduction portion for distributing the gas; and the plurality of chambers communicating with the main passage portion. In particular, the airbag body includes: the front inflating portion formed by at least one chamber and being inflatable and deployable so as to correspond to the position of the side window portion on the front side of the vehicle body; and the rear inflating portion formed of at least one chamber and being inflatable and deployable so as to correspond to the position of the side window portion on the rear side of the vehicle body.

In the rear inflating portion, at least one chamber disposed at a lower end portion of the airbag body is provided with the bend-facilitating portion composed of a non-inflating portion of the airbag body and facilitating bending of the airbag body during inflation and deployment. In this case, the bend-facilitating portion is provided so as to correspond to the position between the front and rear end portions of the rear window portion in the front and rear direction of the vehicle body, and in the chamber including this bend-facilitating portion, the passage through which the gas is distributed so as to come around behind the bend-facilitating portion from above is formed, for example.

In the curtain airbag device according to the present invention including the curtain airbag provided with such a bend-facilitating portion, when the airbag body is supplied with a gas and thus inflates and deploys, in the chamber provided with the bend-facilitating portion of the rear inflating portion, the gas flows so as to come around behind the bend-facilitating portion from above the bend-facilitating portion in one direction and inflates a portion behind the bend-facilitating portion.

Accordingly, the expansion pressure is generated in the airbag body, the force causing the rear-half portion of the airbag body to significantly bend downward from the bend-facilitating portion serving as the origin, while the bend-facilitating portion and the periphery thereof are partially lifted upward. Thus, it is made possible to cause the airbag body to bend in an arch shape. The airbag body that has bent in this arch shape causes the rear lower end portion of the airbag body to deform so as to turn downward while being pulled forward.

Accordingly, even when a curtain airbag is formed in such a small size that the rear lower edge in the inflating portion of the airbag body is disposed above the belt line, it is made possible to cause the inflating portion of the airbag body to extend below the belt line and to overlap with the side door (door trim). Thus, the inflating portion of the airbag body is supported by the side door disposed below the side window portion and thus can effectively acquire the reaction force. Accordingly, the curtain airbag can safely protect the head of an occupant, and the occupant can be surely prevented from being thrown out of the vehicle.

In particular, the airbag body of the present invention is formed in such a small size that the lower edge of the rear inflating portion is disposed at a position identical to or above the lower end position of the side window portion on the rear side when the curtain airbag in a state of being attached to the vehicle body is spread without a supply of gas.

When the airbag body can be reduced in size as described above, the fabric panels forming the airbag body can be reduced in size as well, and the output of the inflator which supplies the gas to the airbag body can be suppressed to a low level. Thus, the curtain airbag device can be reduced in size and/or weight and/or reduced in manufacturing costs.

Even when the airbag body of the present invention is reduced in such a small size that the lower edge of the rear inflating portion is disposed at a position identical to or above the lower end position of the side window portion on the rear side as described above, the rear inflating portion of the airbag body can be surely overlapped with the side door by causing the airbag body to bend from the bend-facilitating portion serving as the origin during inflation and deployment of the curtain airbag, and thereby causing the rear inflating portion of the airbag body to deform so as to extend below the lower end position of the side window portion on the rear side. Accordingly, the airbag body is supported by the side door and can effectively acquire the reactive force from the side door stably.

In the curtain airbag device of the present invention described above, the bend-facilitating portion of the airbag body is provided by partially dividing the chamber to include the bend-facilitating portion into upper and lower portions. Accordingly, when the airbag body inflates and deploys, the upper and lower portions of the chamber divided using the bend-facilitating portion each inflate in the vehicle width direction. Thus, the lower edge of the portion of the airbag body where the bend-facilitating portion is provided is pulled upward and thus is lifted relatively upward as compared with the position of the lower edge of the other portion of the airbag body where the bend-facilitating portion is not provided.

Lifting the lower edge of the portion of the airbag body where the bend-facilitating portion is provided relatively upward can cause the airbag body to bend more significantly in an arch shape. As a result, it is possible to cause the inflating portion of the airbag body to more significantly extend below the belt line and to more surely cause the inflating portion of the airbag body to overlap with the side door of the vehicle body. Moreover, a larger area of overlapping part of the inflating portion and the side door can be secured.

In the present invention, the bend-facilitating portion of the curtain airbag is composed of the linear non-inflating portion formed by the sewing line for sewing, in a curved shape or linear shape, together the fabric panels forming the airbag body, the linear non-inflating portion extending upward or obliquely-rear upward from the lower edge portion of the outer-peripheral non-inflating portion provided at the outer-peripheral portion of the airbag body. Forming the bend-facilitating portion by the linear non-inflating portion enables in a stable manner bending of the airbag body that inflates and deploys, from the bend-facilitating portion serving as the origin.

Moreover, in the curtain airbag device of the present invention, the chamber including the bend-facilitating portion and disposed at the lower end portion of the airbag body communicates, via the throttle portion, with another chamber adjacent thereto. Thus, when the airbag body inflates, the chamber including the bend-facilitating portion can be set under a low pressure state by causing the chamber to inflate at a timing later than the timing at which the other chamber adjacent thereto inflates. Accordingly, when an occupant comes into contact with the other chamber, for example, the gas in the other chamber can be released to the chamber including the bend-facilitating portion. As a result, the reactive force received by the occupant from the airbag body can be effectively absorbed. Moreover, the chamber including the bend-facilitating portion is capable of keeping the gas within the chamber without releasing the gas to the outside of the chamber. Thus, the internal pressures of the chamber including the bend-facilitating portion and the other chamber adjacent thereto are stably kept at a certain level after the occupant comes into contact with the airbag body, so that the occupant can be safely protected for a certain period of time or longer.

In this case, the bend-facilitating portion is disposed in the rearward of the throttle portion of the chamber in the front and rear direction of the vehicle, so that it is possible to cause the airbag body to effectively bend in an arch shape from the bend-facilitating portion serving as the origin, when the airbag body inflates and deploys.

In addition, since the bend-facilitating portion is disposed below the throttle portion of the chamber in the up and down direction of the vehicle, the flow of gas that has passed through the throttle portion is not blocked by the bend-facilitating portion. Thus, the gas can be efficiently distributed behind and/or below the bend-facilitating portion from above the bend-facilitating portion.

Moreover, regarding the lower end of the chamber including the bend-facilitating portion, the lower end on the side of the throttle portion from the bend-facilitating portion (upstream side) is disposed upward with respect to the lower end on the downstream side from the bend-facilitating portion which serves as the boundary. Forming the sewing line at the lower end of the chamber makes it easier to dispose the bend-facilitating portion below the throttle portion. Moreover, a larger downward or rearward region of the bend-facilitating portion can be easily secured. Thus, the distribution of gas becomes stable, and the airbag body can be caused to bend more effectively.

DESCRIPTION OF EMBODIMENT

Hereinafter, a description will be given of a preferred embodiment of the present invention in detail with reference to the accompanying drawings. However, the present invention is by no means limited to the following embodiment, and various modifications are possible within a range where the modification has a configuration which is substantially identical to and which also brings about an operational effect similar to the configuration recited in the appended claims of the present invention.

For example, the form of a vehicle body in which a curtain airbag device of the present invention is mounted is not limited to any particular form, and the shape of an inflating portion formed in an airbag body of the curtain airbag and/or the shape of a sewing portion where fabric panels are sewed together are/is optionally changeable according to the form of the vehicle body, for example. Moreover, a description will be given, in the following embodiment, of a curtain airbag device attached to a two-row seat automobile, but the curtain airbag device of the present invention is applicable to a single-row or three-row seat automobile in a similar manner. The airbag may be produced as a bag which has a desired internally-partitioned structure when formed using a sack weaving technique such as jacquard weaving, other than being produced by sewing fabrics together.

Figure 1:
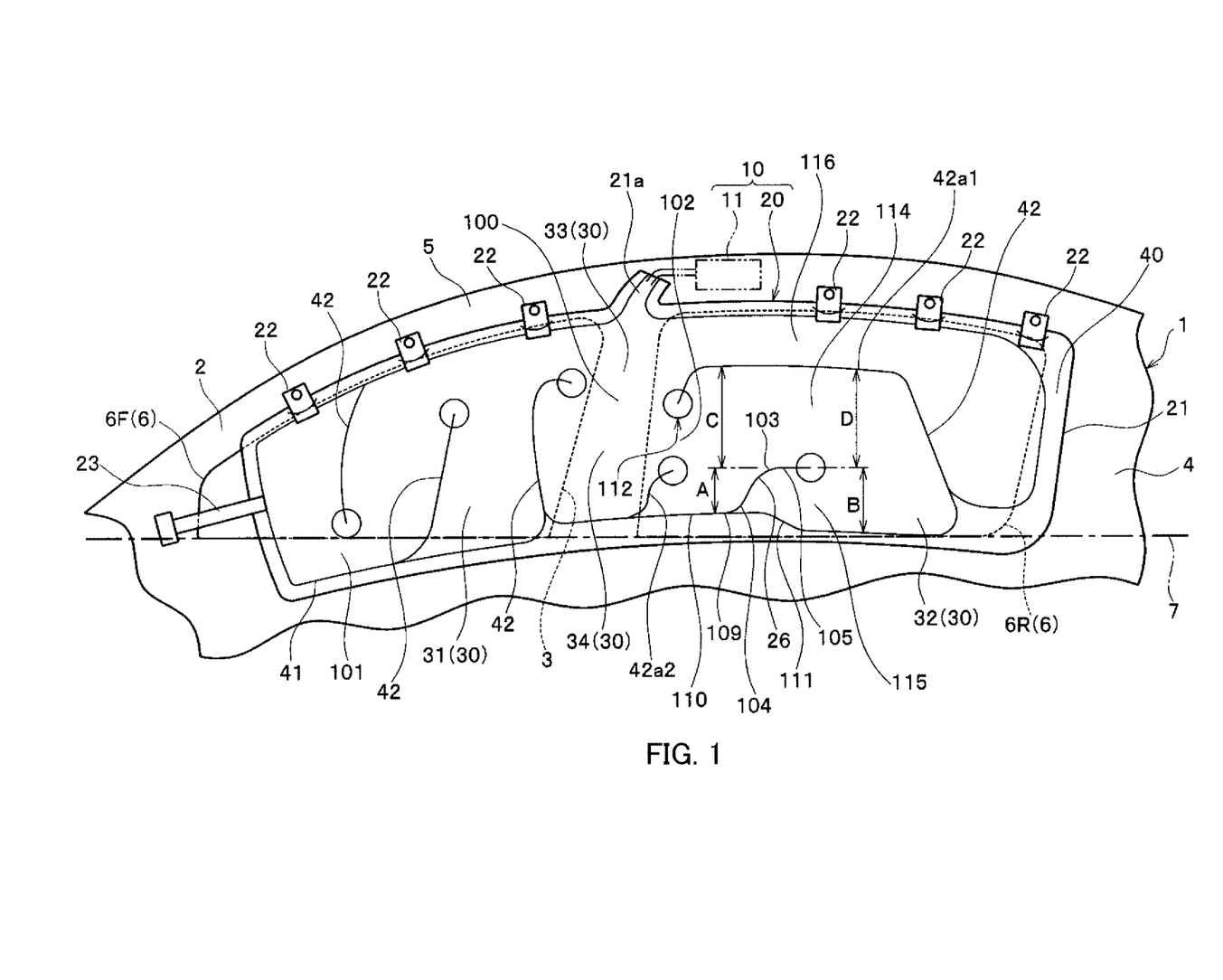
FIG. 1 is a side view of a state of a curtain airbag according to an embodiment of the present invention is attached to a vehicle body and spread without a supply of gas.
Figure 2:
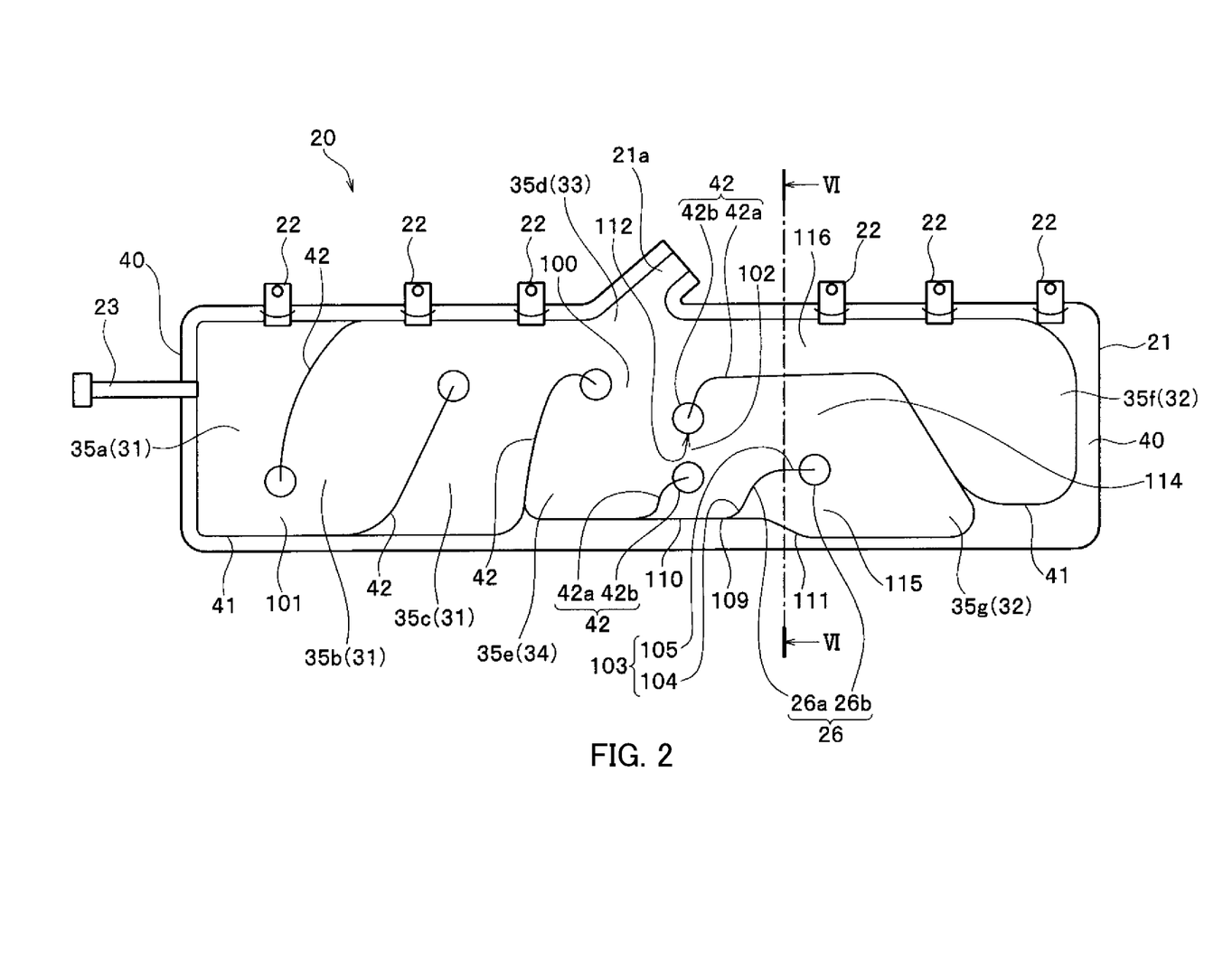
FIG. 2 is a side view of the curtain airbag before being attached to the vehicle body.

FIG. 1 is a side view of a state where a curtain airbag deploys without a supply of gas. FIG. 2 is a side view of the curtain airbag which is spread before being attached to a vehicle body. Note that, in the following description, the front and rear direction, the up and down direction, and the left and right direction respectively refer to the vehicle-length direction (forward and rearward direction), the vehicle height direction, and the vehicle width direction of a vehicle body when the curtain airbag device is mounted. Curtain airbag device 10 of the present embodiment includes curtain airbag 20, and inflator 11 which generates a gas to be supplied to curtain airbag 20.

Curtain airbag 20 in a state of being folded using a predetermined procedure is housed in a range extending from an upper portion of front pillar 2 (A pillar) to the vicinity of rear pillar 4 (C pillar) through roof-side portion 5. Curtain airbag 20 is formed so as to cover the vehicle interior of side window portions (side window glasses) 6 for front and rear seats and extend along side window portions 6 at the front and rear and center pillar 3 (B pillar) at the time of deployment. Inflator 11 is disposed at roof-side portion 5, and a gas jetting port of inflator 11 is inserted into airbag body 21 (to be described, hereinafter) of curtain airbag 20.

The automobile in which curtain airbag device 10 of the present embodiment is mounted includes a front-seat and a rear-seat (not illustrated) where an occupant can be seated in the vehicle interior. Front-row and rear-row side window portions 6F and 6R corresponding to the front and rear seat positions are provided as side window portions 6 on the left and right sides of vehicle body 1. In addition, vehicle body 1 of the automobile includes: front pillar 2 disposed along a windshield (not illustrated) of vehicle body 1; rear pillar 4 disposed at a rear portion of vehicle body 1; and center pillar 3 disposed between front pillar 2 and rear pillar 4, and roof-side portion 5 is disposed along the upper end portions of pillars 2, 3, and 4.

Curtain airbag 20 of curtain airbag device 10 includes: airbag body 21 which is supplied with a gas and thus inflates; a plurality of attachment pieces 22 used for attaching airbag body 21 to vehicle body 1; tether strap (also referred to as "tension strap") 23 having one end attached to the front end portion of airbag body 21 by sewing and the other end fixed to front pillar 2; and a sleeve (not illustrated) which covers airbag body 21 in the folded state to keep airbag body 21 in the folded state. Note that, tether strap 23 and the sleeve in curtain airbag 20 of this embodiment is formed in a manner substantially similar to the tether belt and sleeve to be provided in a general curtain airbag according to the related art.

Figure 4:
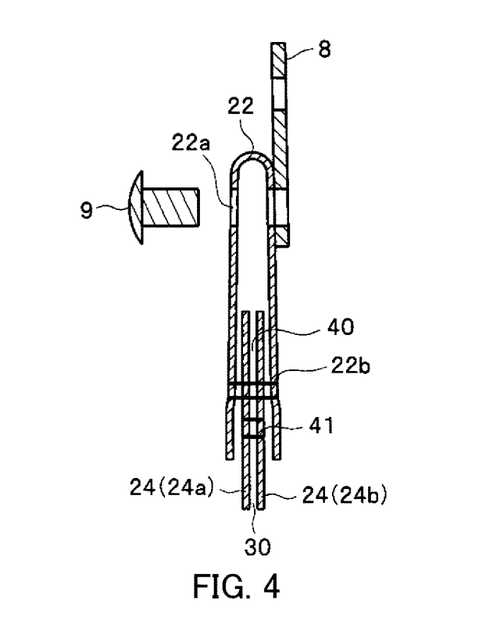
FIG. 4 is a cross-sectional view taken along the IV-IV line illustrated in FIG. 3.

Airbag body 21 of the present embodiment is formed in a substantially rectangular shape elongated in the front and rear direction by sewing together left and right fabric panels 24 having airtight properties (vehicle-interior-side and vehicle-exterior-side fabric panels 24a and 24b) placed together in an overlapped manner. Fabric panels 24 (vehicle-interior-side and vehicle-exterior-side panels 24a and 24b) are illustrated in FIG. 4 to be described, hereinafter. Vehicle-interior-side and vehicle-exterior-side fabric panels 24a and 24b in airbag body 21 are each composed of a fabric which is weaved using a 315 denier nylon 66 string and which has a weight of 200 grams per square meter, for example, and further, the surface of each panel is coated with a resin such as a rubber or a silicone elastomer resin. Note that, the material for the fabric panels is by no means limited to any particular material and is appropriately changeable in this invention.

As illustrated in FIGS. 1 and 2, airbag body 21 of the present embodiment includes: inflating portion 30 which is hollow and is capable of inflating and deploying when supplied with a gas; gas introduction portion 21a provided at an upper end portion of a middle portion of airbag body 21 in the front and rear direction and communicating with the gas jetting port of inflator 11; and outer-peripheral non-inflating portion 40 formed at an outer periphery of airbag body 21 except for the introduction port of gas introduction portion 21a. In this case, outer-peripheral non-inflating portion 40 of airbag body 21 is formed by being partitioned from inflating portion 30 by outer-peripheral attachment sewing line 41 for attaching by sewing the outer peripheral edges of fabric panels 24 in the left and right, and inflating portion 30 is sealed by outer-peripheral attachment sewing line 41.

Inflating portion 30 of airbag body 21 includes front-row inflating portion 31 (which corresponds to "front inflating portion"), rear-row inflating portion 32 (which corresponds to "rear inflating portion"), communication portion (main passage portion) 33, and middle inflating portion 34. Front-row inflating portion 31 is an inflatable and deployable region corresponding to the position of front-row side window portion 6E Rear-row inflating portion 32 is an inflatable and deployable region corresponding to the position of rear-row side window portion 6R. Communication portion (main passage portion) 33 is a region disposed at an upper portion of airbag body 21, connected to gas introduction portion 21a described above, and communicating between front-row and rear-row inflating portions 31 and 32. Middle portion 34 is a region disposed under communication portion 33 and capable of inflating and deploying along center pillar 3.

Inflating portion 30 of airbag body 21 is divided into seven chambers including first to seventh chambers 35a to 35g by an attachment sewing line which is used for attaching by sewing fabric panels 24 in the left and right and which is different from outer-peripheral attachment sewing line 41. First to seventh chambers 35a to 35g directly or indirectly communicate with communication portion (main passage portion) 33. Note that, non-inflating portions 42 are formed by attachment sewing lines serving as partitions for chambers 35a to 35g. Non-inflating portions 42 regulate the width dimension (thickness) of inflating portion 30 in the left and right direction when inflating portion 30 inflates.

Non-inflating portions 42 each include: linear non-inflating portion 42a composed of a curve or a combination of a line and a curve so as to partition inflating portion 30; and circular non-inflating portion 42b disposed at the leading end portion of linear non-inflating portion 42a while being surrounded by inflating portion 30, and formed in a circular shape (closed curve shape).

First chamber 35a in inflating portion 30 of the present embodiment is disposed at the front-most end side of inflating portion 30 from an upper end of inflating portion 30 to a lower end thereof. Second and third chambers 35b and 35c are each formed so as to extend from the upper end of inflating portion 30 to the lower end thereof sequentially behind first chamber 35a. Fourth chamber 35d is disposed behind the upper end portion of third chamber 35c and forms communication portion 33 of inflating portion 30.

Fifth chamber 35e is disposed under fourth chamber 35d. Sixth chamber 35f is disposed from the rear end of fourth chamber 35d to the rear end portion of inflating portion 30. Sixth chamber 35f is formed so as to extend from the upper end to the lower end of inflating portion 30 at the rear end portion of inflating portion 30. Seventh chamber 35g is disposed behind fifth chamber 35e while being surrounded by fifth chamber 35e and sixth chamber 35f. Seventh chamber 35g is formed so that the gas supplied to inflating portion 30 from gas introduction portion 21a flows between two circular non-inflating portions 42b from fifth chamber 35e into seventh chamber 35g.

In inflating portion 30 of this embodiment, front-row inflating portion 31 disposed so as to correspond to the position of front-row side window portion 6F is formed of first to third chambers 35a to 35c. In particular, second and third chambers 35b and 35c form the primary inflating portion of front-row inflating portion 31. In addition, first chamber 35a forms the auxiliary inflating portion of front-row inflating portion 31, which communicates through a narrow passage (throttle passage 101) from the primary inflating portion of second chamber 35b.

In addition, rear-row inflating portion 32 disposed so as to correspond to the position of rear-row side window portion 6R is formed of sixth and seventh chambers 35f and 35g, and particularly, sixth chamber 35f forms the primary inflating portion of rear-row inflating portion 32. Moreover, seventh chamber 35g forms the auxiliary inflating portion of rear-row inflating portion 32, which communicates through a narrow passage (throttle passage 102) from fifth chamber 35e.

Middle inflating portion 34 which inflates and deploys along center pillar 3 is formed of fifth chamber 35e. Note that, auxiliary inflating portion (first chamber) 35a of front-row inflating portion 31 and auxiliary inflating portion (seventh chamber) 35g of rear-row inflating portion 32 are provided to absorb the impact to be received by the occupant from inflating portion 30, by releasing the gas via throttle passages 101 and 102 while the occupant is restrained.

More specifically, the gas supplied from inflator 11 causes fourth chamber 35d to inflate and then advances beyond fourth chamber 35d, thereby causing fifth chamber 35e to inflate. In this case, communication passage 100 which communicates between two adjacent chambers, namely, fourth and fifth chambers 35d and 35e has a sufficient width, and the gas distribution is relatively smooth. For this reason, fourth and fifth chambers 35d and 35e inflate immediately after activation of the airbag device.

Meanwhile, narrow throttle passage 102 regulates the flow of gas into seventh chamber 35g communicating with fifth chamber 35e, and the distribution of gas via throttle passage 102 is not as smooth as the distribution of gas via communication passage 100 between fourth and fifth chambers 35d and 35e. For this reason, during an early state of deployment of curtain airbag 20, seventh chamber 35g does not inflate very much although fifth chamber 35e surely inflates.

When a side impact occurs in this state, and the occupant thus comes into contact with airbag body 21, particularly, fifth chamber 35e, fifth chamber 35e is pressed by the occupant, and the gas inside fifth chamber 35e attempts to flow outside fifth chamber 35e. The position of fifth chamber 35e is where the seated occupant is expected to come into contact in this case. Unlike fifth chamber 35e, the position of seventh chamber 35g is under a relatively low pressure without much inflation, so that seventh chamber 35g is capable of reasonably receiving a gas via throttle passage 102. For this reason, the effect of cutting off the bounding peak in fifth chamber 35e can be acquired by seventh chamber 35g communicating with fifth chamber 35e. More specifically, it is possible to promptly and gently restrain the occupant from moving, without rebounding of the occupant in contact with fifth chamber 35e and to absorb the shock on the occupant when the occupant hits to the vehicle interior wall.

Examples of the form of a typical driver sheet airbag according to the related art include a form in which a vent hole formed therein, which serves as a small hole opening to the outside of the bag. In the airbag including a vent hole formed therein, most of the gas in the bag is released into the atmosphere and the bag deflates shortly after the occupant is restrained.

In contrast to this form, in curtain airbag 20 of the present embodiment, seventh chamber 35g is a closed chamber having no passage opening to the outside of the chamber. Accordingly, even after the peak internal pressure of fifth chamber 35e in contact with the occupant is lowered by releasing the gas into seventh chamber 35g, the gas inside seventh chamber 35g is not freely released into the atmosphere. For this reason, no drastic reduction of the internal pressure occurs in fifth chamber 35e, and it is thus possible to keep at least a certain level of internal pressure for a reasonable amount of time, e.g., a few seconds. This feature is extremely effective in side impacts.

This is because, in side impacts, a vehicle overturns (rollover) right after receiving the initial impact in some cases, and during the overturning, the occupant can be protected because the internal pressure of the airbag is kept without complete deflation for a few seconds after activation of the airbag device. The auxiliary inflating portion such as seventh chamber 35g described above may be called an internal vent in a sense that the auxiliary inflating portion is a chamber that is embedded inside the airbag and that enables adjustment of the internal pressure.

The relationship between fifth chamber 35e and seventh chamber 35g described above also holds true between first chamber 35a and second chamber 35b. Moreover, the effect of cutting off the bounding peak and/or the effect of holding the internal pressure by auxiliary inflating portion (seventh chamber) 35g is acquired not only in a case where the occupant comes into contact with fifth chamber 35e but also in a case where the occupant comes into contact with sixth chamber 35f into which the gas is smoothly distributed.

Rear-row inflating portion 32 of airbag body 21 has a dimension not exceeding belt line 7 such that the lower edge of rear-row inflating portion 32 is disposed at the same position as that of belt line 7 or above belt line 7 when curtain airbag 20 in a state of being attached to vehicle body 1 is spread without a supply of gas. Moreover, rear-row inflating portion 32 is provided with bend-facilitating portion 26 which facilitates bending of airbag body 21 during inflation and deployment of curtain airbag 20 so that rear-row inflating portion 32 of airbag body 21 extends beyond belt line 7 and overlaps with a rear-row side door (door trim) (to be described hereinafter in detail) when curtain airbag 20 inflates and deploys.

Bend-facilitating portion 26 is formed of attachment sewing line 103, which is different from the attachment sewing lines serving as the partitions of chambers (non-inflating portions 42). Bend-facilitating portion 26 is provided at seventh chamber 35g (rear-row inflating portion 32) disposed at the lower end portion of airbag body 21.

As described above, a part of attachment sewing line 103 (non-inflating portion 104 to be described, hereinafter) is formed so as to extend obliquely-rear upward from a lower side portion of outer-peripheral attachment sewing line 41. For this reason, seventh chamber 35g has a passage through which the gas is distributed so as to come around behind bend-facilitating portion 26 through above attachment sewing line 103 and further come around under attachment sewing line 103 from behind attachment sewing line 103.

Moreover, sixth chamber 35f has a passage through which the gas is distributed so as to come around behind seventh chamber 35g through above seventh chamber 35g. Moreover, the inflating portion that inflates because of the distribution of the gas in this manner is disposed in sixth chamber 35f adjacently above and behind seventh chamber 35g.

Bend-facilitating portion 26 is provided so as to correspond to a position between the front and rear end portions of rear-row side window portion 6R in the front and rear direction of vehicle body 1 in a case where curtain airbag 20 is attached to vehicle body 1 via a plurality of attachment pieces 22 and spread flat without a supply of gas. More preferably, bend-facilitating portion 26 is provided so as to correspond to a position between the front end portion of rear-row side window portion 6R and a center portion of the same in the front and rear direction.

In particular, attachment sewing line 103 forming bend-facilitating portion 26 is disposed so as to cause airbag body 21 to bent in a way to be described hereinafter (see FIG. 7 to be described hereinafter) during inflation and deployment of curtain airbag 20. Attachment sewing line 103 is preferably disposed in the vicinity of a front position of curtain airbag 20 caused to inflate and deploy, which is to be overlapped with a rear-row side door trim. Moreover, attachment sewing line 103 is preferably disposed in the vicinity of a position where the head of the rear-row occupant comes into contact (hit position) in curtain airbag 20 that has inflated and deployed.

Bend-facilitating portion 26 in the present embodiment includes linear non-inflating portion 26a and circular non-inflating portion 26b formed in seventh chamber 35g by attachment sewing line 103 of fabric panels 24. Linear non-inflating portion 26a of bend-facilitating portion 26 includes: first linear non-inflating portion 104 extending and curving obliquely-rear upward to the inner side of seventh chamber 35g from a lower side portion of outer-peripheral attachment sewing line 41 (or lower end portion of outer-peripheral non-inflating portion 40) of fabric panels 24; and second linear non-inflating portion 105 extending linearly rearward along the front and rear direction from the leading end of first linear non-inflating portion 104. Circular non-inflating portion 26b of bend-facilitating portion 26 is provided at the leading end of second linear non-inflating portion 105 above and apart from the lower end portion of outer-peripheral non-inflating portion 40. In addition, circular non-inflating portion 26b has a circular shape surrounding the leading end of second linear non-inflating portion 105.

Outer-peripheral attachment sewing line 41 includes linear portion 110 extending rearward from intersection 109 with outer-peripheral attachment sewing line 41 and being present in the front and rear direction with intersection 109 of outer-peripheral attachment sewing line 41 as the reference; and slope portion 111 which slopes downward behind linear portion 110 and bends.

Seventh chamber 35g is divided into upper and lower portions by attachment sewing line 103 in a partial range in the front and rear direction where attachment sewing line 103 is formed. The upper portion of seventh chamber 35g above attachment sewing line 103 inflates mainly by the gas flowing from fifth chamber 35e via throttle passage 102. Meanwhile, the portion of seventh chamber 35g below attachment sewing line 103 inflates by the gas that flows so as to come around behind attachment sewing line 103 from above attachment sewing line 103.

The line configuration of outer-peripheral attachment sewing line 41 and attachment sewing line 103 sets such a relationship between distances A, B, C, and D that distances C and D are substantially equal in length and distance C is longer than distance B, while distance B is longer than distance A, where: distance A is between outer-peripheral attachment sewing line 41 (linear portion 110) right before intersection 109 and a forward virtual line formed by extending second linear non-inflating portion 105 forward; distance C is between the forward virtual line and non-inflating portion 42a1 forming the upper end of seventh chamber 35g; distance B is between outer-peripheral attachment sewing line 41 positioned behind slope portion 111 and a rearward virtual line formed by extending second linear non-inflating portion 105 rearward linearly; and distance D is between this rearward virtual line and non-inflating portion 42a1 as illustrated in FIG. 1. Thus, providing slope portion 111 behind of intersection 109 of outer-peripheral attachment sewing line 41 makes distance B longer than distance A, thus making it possible to ensure that the region below attachment sewing line 103 is large in size. For this reason, it is made easier for the gas to flow in such a way as to come around behind attachment sewing line 103.

As illustrated in FIG. 1, the level of the end portion of non-inflating portion 42a2 extending upward from outer-peripheral attachment sewing line 41 for forming throttle passage 102 and the level of the end portion of second linear non-inflating portion 105 are set substantially equal to each other with respect to outer-peripheral attachment sewing line 41 positioned right before intersection 109 (linear portion 110). This positional relationship prevents second linear non-inflating portion 105 from hindering the flow of the gas passing through throttle passage 102. Second linear non-inflating portion 105 may be positioned somewhat upward (closer to the roof rail), that is, may be positioned so as to make distance C somewhat smaller, but it is more preferable that second linear non-inflating portion 105 be disposed at a position sufficiently lower than the position of upper end 112 of throttle passage 102. This is because this arrangement allows the gas to be effectively distributed in such a way that the gas flowing inside seventh chamber 35g flows above second linear non-inflating portion 105 and comes around behind second linear non-inflating portion 105, without extremely reducing throttle passage 102 in width by a folded wrinkle.

Figure 3:
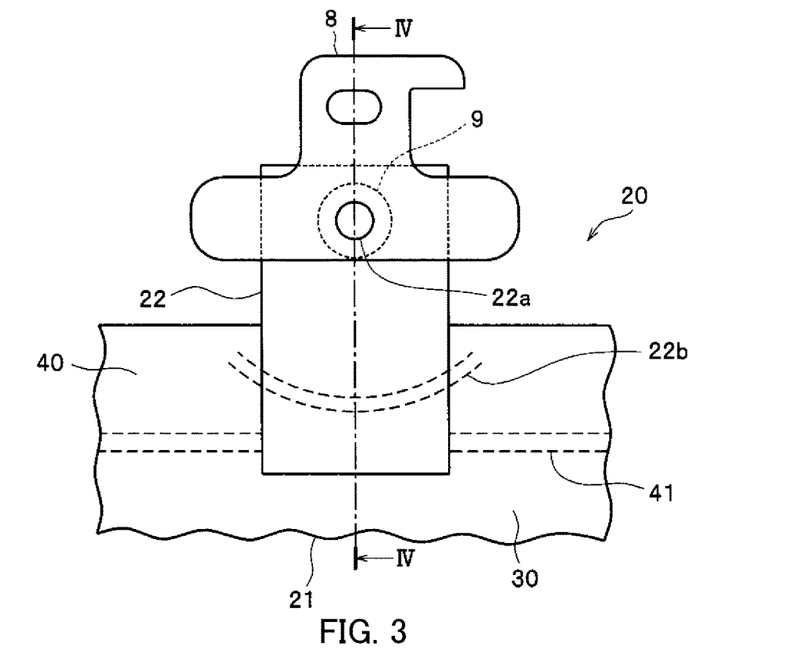
FIG. 3 is a primary-part enlargement view illustrating, in an enlarged manner, the portion of the curtain airbag where an attachment piece is attached to the airbag body by sewing.

A plurality of attachment pieces 22 is attached to the upper end portion of airbag body 21 with intervals between attachment pieces 22 so as to correspond to the positions of attachment brackets 8 fixedly provided at roof side portion 5 of vehicle body 1. As illustrated in FIGS. 3 and 4, attachment pieces 22 are each formed by a square-shaped fabric provided with two circular attachment holes 22a. FIG. 3 is a primary-part enlargement view illustrating the portion of curtain airbag 20 where attachment piece 22 is attached to airbag body 21 by sewing, in an enlarged manner. In addition, FIG. 4 is a cross-sectional view taken along the line IV-IV illustrated in FIG. 3.

As illustrated in FIG. 3, attachment piece 22 having a square shape is folded in half so that the positions of two attachment holes 22a overlap with each other, and airbag body 21 is placed between the folded portions of attachment piece 22. Attachment piece 22 is formed to partially protrude from airbag body 21, and while both end portions of attachment piece 22 are set to overlap with the vehicle interior and exterior surfaces of airbag body 21, two overlapped end portions of attachment piece 22 and two fabric panels 24 of airbag body 21 are sewed together with sewing thread. Thus, attachment piece 22 is attached to the upper end portion of airbag body 21. In this case, attachment holes 22a formed in attachment piece 22 are disposed at a position apart from airbag body 21.

As illustrated in FIG. 3, in curtain airbag 20 of this embodiment, sewing line (sewing thread) 22b having a linear shape, which is formed by the sewing thread used to sew attachment piece 22 to the upper end portion of airbag body 21, is disposed in a curved or bent shape protruding in a downward direction where inflating portion 30 is provided, unlike the related art in which sewing line 22b is disposed linearly in parallel with the upper edge of the airbag body. Particularly, in this embodiment, sewing line 22b for attaching attachment piece 22 by sewing is formed in an arch-like curve of a circle around attachment hole 22a at an outer side (upper side) position from outer-peripheral attachment sewing line 41 of airbag body 21.

Attachment piece 22 of the curtain airbag described above is fixed to attachment bracket 8 by inserting fixing member 9 such as a screw or bolt into attachment hole 22a from one side of attachment piece 22 while the surface of the other side of attachment piece 22 is overlapped with attachment bracket 8 while the position of attachment hole 22a of attachment piece 22 and the position of the through hole of attachment bracket 8 are matched as illustrated in FIG. 4. Curtain airbag 20 is attached to vehicle body 1 by attachment piece 22 described above.

As illustrated in FIG. 3, each attachment piece 22 of the present embodiment is sewed to airbag body 21 by sewing line 22b having an arc shape around attachment piece 22a. For this reason, even when a large stress is applied to each attachment piece 22 of curtain airbag 20 due to inflation and deployment of airbag body 21 after airbag body 21 is supplied with a gas and thus inflates and deploys, the stress during the inflation and deployment is not concentrated at the boundary portion and is effectively spread over the entirety of the arc shaped sewing line.

Thus, it is possible to effectively prevent the sewing thread used to sew attachment pieces 22 to airbag body 21 from becoming loose and/or being cut during inflation and deployment of airbag body 21 and/or to prevent fabric panel 24 of airbag body 21 from being damaged, for example, without application of excessive reinforcement to the circumference of attachment piece 22 of curtain airbag 20 as in the related art, for example. Accordingly, robust curtain airbag 20 can be formed using a simple structure, and it is also possible to prevent an increase in manufacturing costs and/or weight of the airbag device otherwise caused by the reinforcement for attachment pieces 22.

Figure 5:
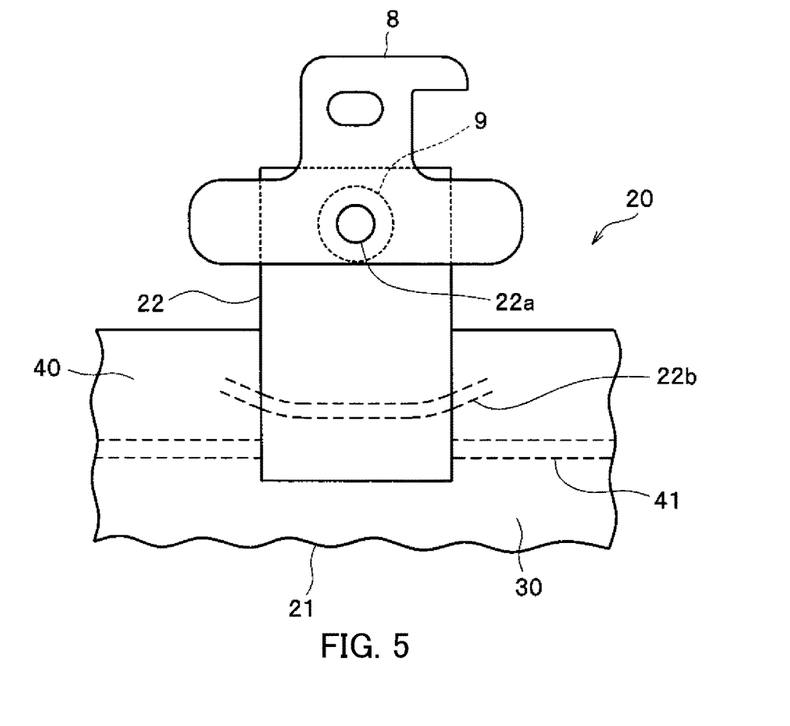
FIG. 5 is a primary-part enlargement view illustrating a variation of a sewing line for sewing the attachment piece to the airbag body.

Note that, sewing line 22b for attachment used to sew attachment pieces 22 in this present embodiment is formed in the arc shape around attachment hole 22a as described above, but may be formed in a shape in which the entirety of sewing line 22b exhibits a curved or bent shape protruding downward to inflating portion 30 as illustrated in FIG. 5, for example, instead of the arc shape, in order that the stress during inflation and deployment of airbag body 21 can be spread. FIG. 5 is a primary-part enlargement view of a variation of the sewing line used to sew an attachment piece to an airbag body.

When curtain airbag device 10 of this embodiment described above is attached to vehicle body 1 of an automobile, curtain airbag body 21 of curtain airbag 20, which is spread flat as in FIG. 2, is folded from the lower end portion thereof toward the upper portion thereof in a roll or an accordion fold. Moreover, a sleeve (not illustrated) is placed to cover the entirety of curtain airbag 20 so as to keep curtain airbag 20 in the folded state. Note that, the way to fold or the procedure to fold curtain airbag 20 is not limited to a particular way or procedure in the present invention.

Next, attachment pieces 22 of curtain airbag 20, which protrude outward from the sleeve, are each fixed to attachment bracket 8 fixedly provided to vehicle body 1 via fixing member 9 such as a screw. Thus, curtain airbag 20 is attached along front pillar 2, roof-side portion 5, and rear pillar 4 of vehicle body 1 and housed.

Note that, inflator 11 of curtain airbag device 10 is attached to a predetermined position of vehicle body 1. The gas jetting port of inflator 11 is inserted into airbag body 21 from the introduction port of gas introduction port 21a of curtain airbag 20.

As described above, when detecting or predicting an accident such as a side impact or a rollover, curtain airbag device 10 of the present embodiment attached to vehicle body 1 generates a high pressure gas for inflation from inflator 11 and causes the gas to flow into airbag body 21 from gas introduction port 21a of curtain airbag 20.

Accordingly, curtain airbag 20 starts inflating and deploying, then breaks the sleeve covering airbag body 21 and deforms a front pillar garnish or roof headlining, for example. As a result, curtain airbag 20 protrudes in the vehicle interior. Moreover, curtain airbag 20 deploys downward along front-row and rear-row side window portions 6F and 6R and center pillar 3.

At this time, the inflation thickness (dimension of the vehicle width direction) of airbag body 21 is regulated by the presence of linear non-inflating portion 42a and circular non-inflating portion 42b formed in airbag body 21 to serve as partitions for first to seventh chambers 35a to 35g and by the line change of outer-peripheral attachment sewing line 41. The entirety of airbag body 21 then inflates in a curved shape (arch shape) in which the entirety of airbag body 21 shrinks toward the center portion in the front and rear direction while curving in a downward recessed shape.

In addition, since airbag body 21 inflates and deploys, as illustrated in FIG. 1, front-row inflating portion 31 of airbag body 21 extends below belt line 7 and thus can stably overlap with the front-row side door trim in a side view of the vehicle.

Furthermore, in the embodiment, bend-facilitating portion 26 composed of linear non-inflating portion 103 as described above is provided in seventh chamber 35g of airbag body 21. Thus, when airbag body 21 inflates and deploys, the gas supplied from gas introduction portion 21a through communication portion (main passage portion) 33 flows behind bend-facilitating portion 26 through above bend-facilitating portion 26 in sixth and seventh chambers 35f and 35g.

To be more specific, in seventh chamber 35g, the gas that has flowed into seventh chamber 35g from communication portion (main passage portion) 33 through fifth chamber 35e comes around behind linear non-inflating portion 103 from above linear non-inflating portion 103 and flows toward the rear lower end portion of airbag body 21 and partially comes around below linear non-inflating portion 103. In particular, since the gas flows into seventh chamber 35g through throttle passage 102 having a narrow width, the flow rate of the gas into seventh chamber 35g increases, so that the gas is smoothly distributed rearward and/or below linear non-inflating portion 103. In addition, in sixth chamber 35f, the gas that has flowed into sixth chamber 35f from communication portion (main passage portion) 33 comes around behind seventh chamber 35g from above seventh chamber 35g provided with bend-facilitating portion 26 and further flows toward the rear lower end portion of airbag body 21.

Since the gas flows into sixth and seventh chambers 35f and 35g, sixth and seventh chambers 35f and 35g inflate and cause the expansion pressures in sixth and seventh chambers 35f and 35g. Thus, the force that makes the rear-half portion of airbag body 20 to bend downward more significantly acts on airbag body 21 from bend-facilitating portion 26 as the origin.

In addition, in this embodiment, in the region where linear non-inflating portion 103 of airbag body 21 is provided in the front and rear direction (front and rear peripheral region of VI-VI line in FIG. 2 in the front and rear direction), seventh chamber 35g is divided in the up and down direction by linear non-inflating portion 103. More specifically, this region provided with linear non-inflating portion 103 is divided into three portions including the lower portion of seventh chamber 35g, the upper portion of seventh chamber 35g, and sixth chamber 35f in the up and down direction by linear non-inflating portion 103, and non-inflating portion 42a1 which serves as a partition between seventh chamber 35g and sixth chamber 35f and which forms the upper end of seventh chamber 35g.

Figure 6:
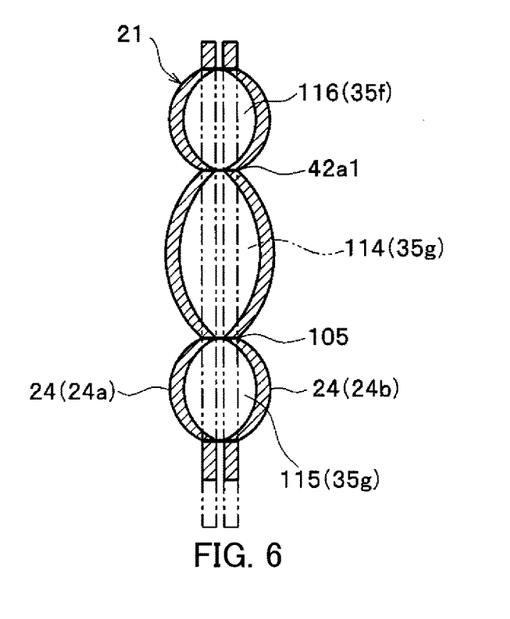
FIG. 6 is a cross-sectional view of a state where the curtain airbag inflates in the cross-section taken along the VI-VI line illustrated in FIG. 2.

Accordingly, when airbag body 21 inflates and deploys, lower portion 115 and upper portion 114 of seventh chamber 35g, which are divided by linear non-inflating portion 103, and front portion 116 of sixth chamber 35f, which has a linear shape and is positioned above upper portion 114, each inflate in the left and right direction as illustrated in FIG. 6, for example, i.e., in a direction to increase the thickness of airbag body 21, and are each reduced in dimension in the up and down direction of the portion. As a result, the position of the lower edge of the region including bend-facilitating portion 26 is pulled in the upward direction where attachment pieces 22 are provided, and is thus lifted relatively upward compared with the position of the lower edge of the other region in airbag body 21. Note that, FIG. 6 is a cross-sectional view of the state where curtain airbag 20 inflates in the cross-section taken along VI-VI line illustrated in FIG. 2.

The region provided with linear non-inflating portion 103 includes an arrangement in which three chambers are vertically aligned as illustrated in FIG. 6. In the rear and front of linear non-inflating portion 103, two chambers are vertically aligned. In addition, as described above, distances C (and D) is longer than distance B and distance B is longer than distance A, while distances C and D are substantially equal to each other in length. For this reason, the front portion of seventh chamber 35g having a height equal to the sum of distances A and C, and the rear portion of seventh chamber 35g having a height equal to the sum of distances B and D are reduced in the vertical direction as compared with the middle portion of seventh chamber 35g provided with linear non-inflating portion 103. For this reason, the region where linear non-inflating portion 103 exists bends significantly while the reign in the front and rear of the region is hard to bend because the thick chambers are formed. Furthermore, the region in front of linear non-inflating portion 103 is thin so that this portion serves as the portion for introducing bending of linear non-inflating portion 103 and thus favorably bends.

Note that, although the region provided with linear non-inflating portion 103 is divided into three regions in the up and down direction by the sewing line in this embodiment, this region may be divided into four or more regions in the up and down direction by the sewing line. In this case, the degree of lifting the position of the lower edge of this region upward can be made larger.

As described above, in this embodiment, during inflation and deployment of airbag body 21, the force causing airbag body 21 to significantly bend from bend-facilitating portion 26 as the origin acts, and the lower edge of the region provided with bend-facilitating portion 26 is partially lifted upward relatively. Thus, airbag body 21 deploys in the form in which the rear-half portion of airbag body 21 is partially bent significantly so as to wind around bend-facilitating portion 26. As a result, the position of the rear lower end portion of airbag body 21 can be actively moved so as to turn downward while being pulled forward.

Accordingly, in airbag body 21 of the present embodiment, although curtain airbag 20 is formed in a size small enough to position the lower edge of rear-row inflating portion 32 above belt line 7 as illustrated in FIG. 1, rear-row inflating portion 32 of airbag body 21 can extend below belt line 7 during inflation and deployment of airbag body 21. Thus, rear-row inflating portion 32 can be overlapped with the rear-row side door stably in a side view of the vehicle, and a large area of overlapping part of rear-row inflating portion 32 and the rear-row side door can be secured.

More specifically, in curtain airbag 20 of this embodiment, when airbag body 21 inflates and deploys, middle inflating portion 34 of airbag body 21 inflates along center pillar 3 so as to overlap with center pillar 3, and front-row and rear-row inflating portions 31 and 32 extend below belt line 7 corresponding to the positions of the lower edges of front and rear side window portions 6F and 6R and thus can be overlapped with front-row and rear-row side door trims, respectively.

Figure 7:
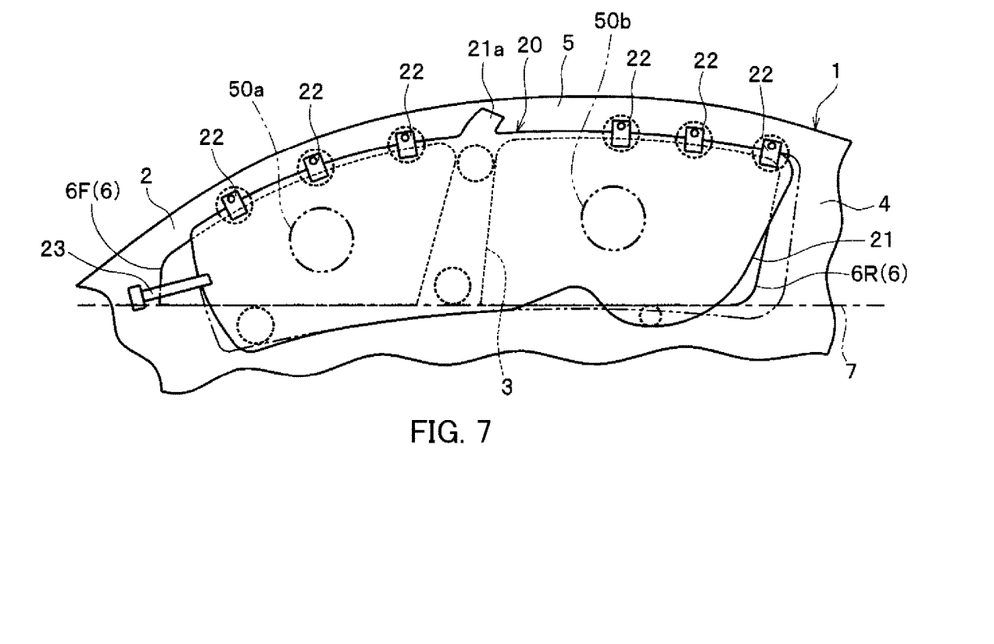
FIG. 7 is a side view of a state where the curtain airbag is supplied with a gas and thus inflates and deploys.

In this case, when the head of a front-row occupant comes into contact with position 50a (hit position) as indicated by an imaginary line in FIG. 7, for example, curtain airbag 20 is supported by vehicle body 1 at the positions of attachment pieces 22. In addition, curtain airbag 20 is supported by center pillar 3 with which middle inflating portion 34 overlaps and the front-row side door with which front-row inflating portion 31 overlaps. FIG. 7 is a side view of the state where curtain airbag 20 is supplied with a gas and thus inflates and deploys. Note that, the portions of curtain airbag 20 supported by vehicle body 1 are each indicated by a broken-line circle.

Thus, curtain airbag 20 is supported by vehicle body 1 so as to surround the head of the front-row occupant (hit position 50a) and thus can effectively acquire a reactive force, so that the head of the front-row occupant can be safely protected by front-row inflating portion 31 of curtain airbag 20, and the front-row occupant can be surely prevented from being thrown out of the vehicle.

In addition, curtain airbag 20 is supported by attachment pieces 22, center pillar 3 with which middle inflating portion 34 overlaps, and the rear-row side door with which rear-row inflating portion 32 overlaps.

Accordingly, for the rear-row occupant, curtain airbag 20 is supported by vehicle body 1 at the position to surround the head of a rear-row occupant (hit position 50b) and thus can effectively acquire a reactive force. Thus, the head of the rear-row occupant can be safely protected by rear-row inflating portion 32 of curtain airbag 20, and the rear-row occupant can be surely prevented from being thrown out of the vehicle.

In particular, the distance between hit position 50b and the portion where attachment piece 22 of curtain airbag 20 is supported by vehicle body 1 and the distance between hit position 50b and the portion where inflating portion 30 of curtain airbag 20 is supported by center pillar 3 and rear-row side door are supported are shorter than the distance between hit position 50b and rear pillar 4, for example, so that the head of the rear-row occupant can be surely supported by curtain airbag 20, and the occupant can be stably protected.

As described above, the performance in reducing the possibility of an occupant being thrown out of the vehicle improves in curtain airbag 20 of the present embodiment, and safety for the occupants seated in the front and rear rows can be ensured. Moreover, curtain airbag 20 is formed in such a small size that the lower edge of rear-row inflating portion 32 is placed above belt line 7 as illustrated in FIG. 1. Accordingly, fabric panels 24 forming airbag body 21 can be reduced in size and the output of inflator 11 can be suppressed to a low level. Thus, curtain airbag device 10 can be effectively reduced in size and/or weight and/or reduced in manufacturing costs.

Note that, in curtain airbag 20 of the embodiment described above, bend-facilitating portion 26 is provided only to seventh chamber 35g of rear-row inflating portion 32. However, in the present invention, the bend-facilitating portion may be provided not only to the rear-row inflating portion, but also to the front-row inflating portion, or may be provided only to the front-row inflating portion.

Moreover, in curtain airbag 20 described above, bend-facilitating portion 26 of seventh chamber 35g includes linear non-inflating portion 26a and circular non-inflating portion 26b composed of an attachment sewing line, but the form (structure) of the bend-facilitating portion in this invention is not limited to this configuration.

Figure 8:
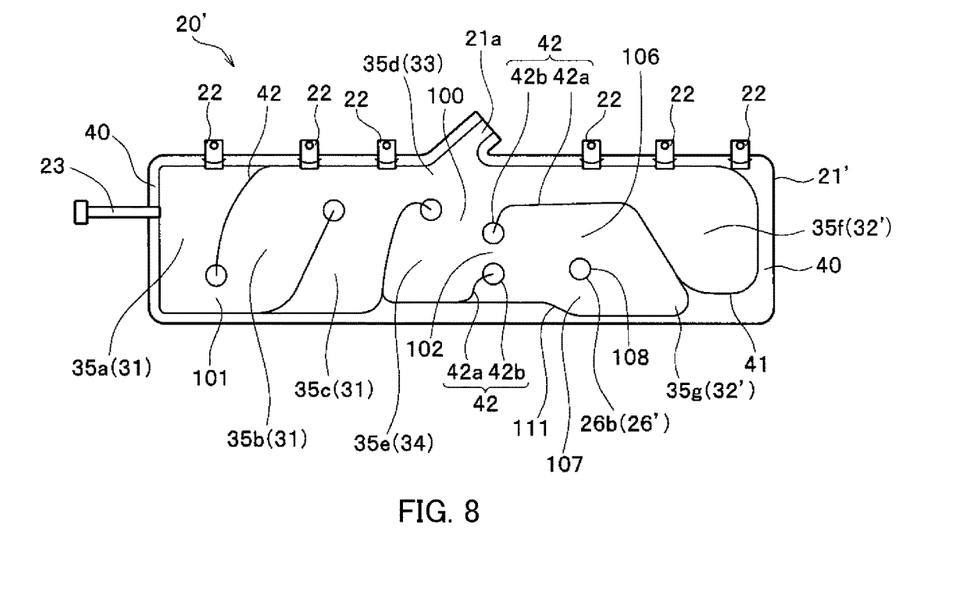
FIG. 8 is a side view of a curtain airbag according to a variation of the embodiment.

FIG. 8 illustrates a variation of the bend-facilitating portion. FIG. 8 is a side view of a curtain airbag according to the variation of the embodiment. Note that, in FIGS. 8 and 9, the portion of the curtain airbag that has a configuration substantially identical to that of curtain airbag 20 of the embodiment described above is assigned the same reference numeral and the detailed description of the portion will be omitted.

In the variation illustrated in FIG. 8, bend-facilitating portion 26' disposed in seventh chamber 35g of airbag body 21' does not include the linear non-inflating portion in the embodiment described above but includes circular non-inflating portion 26b. Accordingly, slope portion 111 is formed in outer-peripheral attachment sewing line 41 below circular non-inflating portion 26b. Note that, bend-facilitating portion 26' according to this variation may not include the circular non-inflating portion in the embodiment mentioned above but may be composed of only the linear non-inflating portion in a way opposite to the case illustrated in FIG. 8.

Note that, when bend-facilitating portion 26' does not include the liner non-inflating portion as in FIG. 8, the gas passage for guiding the gas from above the circular non-inflating portion to the rearward (first gas passage 106) is formed to be larger in size in the up and down direction than the gas passage for guiding the gas from below the circular non-inflating portion to the rearward (second gas passage 107).

In seventh chamber 35g, the gas that flows in from fifth chamber 35e through throttle passage 102 comes around behind circular bonding portion 108 through above circular bonding portion 108 serving as bend-facilitating portion 26' by first gas passage 106 and through below circular bonding portion 108 by second gas passage 107. As described above, since first gas passage 106 is formed to be larger in size in the up and down direction than second gas passage 107, the flow amount of gas in first gas passage 106 is larger than that of second gas passage 107.

Thus, during inflation and deployment of airbag body 21', in seventh chamber 35g of rear-row inflating portion 32', the gas that has flown into seventh chamber 35g from communication portion (main passage portion) 33 through fifth chamber 35e comes around behind circular bonding portion 108 mainly from above circular bonding portion 108. Thus, in this variation as well, a difference in expansion pressure between sixth and seventh chambers 35g and 35f occurs as in the embodiment described above, and the force causing the rear-half portion of airbag body 21 to bend downward from circular bonding portion 108 as the origin acts. Accordingly, curtain airbag 20' according to the variation can bring about an effect similar to that acquired in curtain airbag 20 in the embodiment described above.

Figure 9:
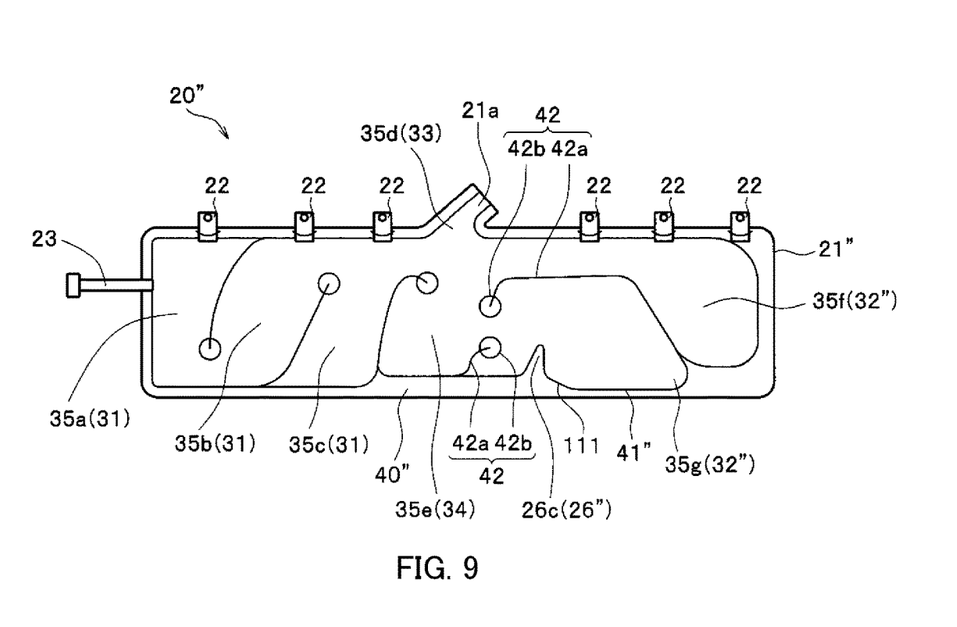
FIG. 9 is a side view of a curtain airbag according to another variation of the embodiment.

The bend-facilitating portion of the present invention may be composed of non-inflating portion 26c having a small width and protruding upward or obliquely-rear upward so as to cut into seventh chamber 35g (rear-row inflating portion 32") of airbag body 21" from the lower end portion of outer peripheral non-inflating portion 40" of airbag body 21" as illustrated in FIG. 9. FIG. 9 is a side view of the curtain airbag according to another variation of the present embodiment.

Non-inflating portion 26c illustrated in FIG. 9 is formed by outer-peripheral attachment sewing line 41" used for sewing the outer-peripheral edges of left and right fabric panels 24 together. Outer-peripheral attachment sewing line 41" partially protrudes toward seventh chamber 35g. In this variation as well, slope portion 111 is provided behind non-inflating portion 26c in outer-peripheral attachment sewing line 41". Note that, while outer-peripheral attachment sewing line 41 similar to outer-peripheral attachment sewing line 41 illustrated in FIG. 2 is formed in airbag body 21, and bend-facilitating portion 26" may be formed by adding, other than outer-peripheral attachment sewing line 41, an attachment sewing line that forms non-inflating portion 26c having a small width.

In curtain airbag 20" in which bend-facilitating portion 26" composed of non-inflating portion 26c having a small width as described above is provided, when airbag body 21" inflates and deploys, the gas flows through above non-inflating portion 26c, then comes around behind non-inflating portion 26c and flows toward the rear lower end portion of airbag body 21" in sixth and seventh chambers 35f and 35g. Thus, the force causing the rear-half portion of airbag body 21" to bend downward significantly from non-inflating portion 26c as the origin acts.

Accordingly, rear-row inflating portion 32" of airbag body 21" extends below belt line 7 and stably overlaps with the rear-row side door. Accordingly, curtain airbag 20" which has inflated and deployed is supported by vehicle body 1 at the position to surround the head of a rear-row occupant and thus can effectively acquire a reactive force. Thus, rear-row inflating portion 32" of curtain airbag 20" can safely protect the head of the rear-row occupant, and the occupant can be surely prevented from being thrown out of the vehicle.

REFERENCE SIGNS LIST

1 Vehicle body
2 Front pillar (A pillar)
3 Center pillar (B pillar)
4 Rear pillar (C pillar)
5 Roof-side portion
6 Side window portion (side window glass)
7 Belt line
8 Attachment bracket
9 Fixing member
10 Curtain airbag device
11 Inflator
20, 20', 20" Curtain airbag
21, 21', 20" Airbag body
21a Gas introduction portion
22 Attachment piece
22a Attachment hole
22b sewing line (sewing thread)
23 Tether strap
24 Fabric panel
24a Vehicle-interior-side fabric panel
24b Vehicle-exterior-side fabric panel
26, 26', 26" Bend-facilitating portion
26a Linear non-inflating portion
26b Circular non-inflating portion
26c Non-inflating portion
30 Inflating portion
31 Front-row inflating portion
32, 32', 32" Rear-row inflating portion
33 Communication portion (main passage portion)
34 Middle inflating portion
35a First chamber
35b Second chamber
35c Third chamber
35d Fourth chamber
35e Fifth chamber
35f Sixth chamber
35g Seventh chamber
40, 40" Outer-peripheral non-inflating portion
41, 41" Outer-peripheral sewing attachment line
42 Non-inflating portion
42a Linear non-inflating portion
42a1, 42a2 Non-inflating portion
42b Circular non-inflating portion
50a, 50b Hit position
100 Passage communicating between fourth and fifth chambers
101, 102 Throttle passage
103 Attachment sewing line
104, 105 Non-inflating portion
106 First gas passage
107 Second gas passage
108 Circular bonding portion
109 Intersection
110 Linear portion
111 Slope portion
112 Upper end of throttle passage
114 Upper portion of seventh chamber
115 Lower portion of seventh chamber
116 Front portion of sixth chamber
A, B, C, D Distance

The invention claimed is:
1. A curtain airbag device comprising:
an inflator configured to generate a gas; and
a curtain airbag to be attached along an upper edge of a side window portion of a vehicle body in a state where the curtain airbag is folded using a predetermined procedure,
wherein:
the curtain airbag includes an airbag body to be supplied with the gas from the inflator to inflate, and
the airbag body inflates and deploys downward by generation of the gas so as to cover the side window portion on a vehicle interior side;
wherein:
the airbag body includes:
a gas introduction portion for introducing the gas into the airbag body,
a main passage portion communicating with the gas introduction portion for distributing the gas, and
a plurality of chambers communicating with the main passage portion;
wherein:
the airbag body includes:
a front inflating portion formed by at least one of the chambers and being inflatable and deployable so as to correspond to a position of the side window portion on a front side of the vehicle body, and
a rear inflating portion formed by at least one of the chambers and being inflatable and deployable so as to correspond to a position of the side window portion on a rear side of the vehicle body;
wherein:
at least one of the chambers disposed at a lower end portion of the airbag body is provided with a bend-facilitating portion composed of a non-inflating portion of the airbag body and facilitating bending of the airbag body during inflation and deployment of the airbag body,
the bend-facilitating portion is disposed so as to correspond to a position between front and rear end portions of the side window portion on the rear side in a front and rear direction of the vehicle body,
the at least one of the chamber including the bend-facilitating portion includes a passage for distributing the gas such that the gas comes around the bend-facilitating portion in one direction, and
the rear inflating portion includes a lower edge disposed at a position identical to or above a lower end position of the side window portion on the rear side when the curtain airbag in a state of being attached to the vehicle body is spread without a supply of the gas, the lower edge deforming downward from the lower end position of the side window portion on the rear side by bending of the airbag body at the bend-facilitating portion serving as an origin during inflation and deployment of the airbag body.

2. A curtain airbag device comprising:
an inflator configured to generate a gas; and
a curtain airbag to be attached along an upper edge of a side window portion of a vehicle body in a state where the curtain airbag is folded using a predetermined procedure,
wherein:
the curtain airbag includes an airbag body to be supplied with the gas from the inflator to inflate, and
the airbag body inflates and deploys downward by generation of the gas so as to cover the side window portion on a vehicle interior side;
wherein:
the airbag body includes:
 a gas introduction portion for introducing the gas into the airbag body,
 a main passage portion communicating with the gas introduction portion for distributing the gas, and
 a plurality of chambers communicating with the main passage portion;
wherein:
the airbag body includes:
 a front inflating portion formed by at least one of the chambers and being inflatable and deployable so as to correspond to a position of the side window portion on a front side of the vehicle body, and
 a rear inflating portion formed by at least one of the chambers and being inflatable and deployable so as to correspond to a position of the side window portion on a rear side of the vehicle body;
wherein:
at least one of the chambers disposed at a lower end portion of the airbag body is provided with a bend-facilitating portion composed of a non-inflating portion of the airbag body and facilitating bending of the airbag body during inflation and deployment of the airbag body,
the bend-facilitating portion is disposed so as to correspond to a position between front and rear end portions of the side window portion on the rear side in a front and rear direction of the vehicle body,
the at least one of the chambers including the bend-facilitating portion includes a passage for distributing the gas such that the gas comes around the bend-facilitating portion in one direction,
the at least one of the chambers disposed at the lower end portion and including the bend-facilitating portion communicates, via a throttle portion, with another chamber adjacent to the chamber, and
the bend-facilitating portion is disposed behind the throttle portion of the other chamber in a front and rear direction of a vehicle.

3. The curtain airbag device according to claim 2, wherein the bend-facilitating portion is provided by partially dividing, into an upper portion and a lower portion, the at least one of the chamber which is to include the bend-facilitating portion.

4. The curtain airbag device according to claim 2, wherein the bend-facilitating portion includes a linear non-inflating portion formed by a sewing line for sewing, in a curved shape or linear shape, together fabric panels forming the airbag body, the linear non-inflating portion extending upward or obliquely-rear upward from a lower edge portion of an outer-peripheral non-inflating portion provided at an outer-peripheral portion of the airbag body.

5. A curtain airbag device comprising:
an inflator configured to generate a gas; and
a curtain airbag to be attached along an upper edge of a side window portion of a vehicle body in a state where the curtain airbag is folded using a predetermined procedure,
wherein:
the curtain airbag includes an airbag body to be supplied with the gas from the inflator to inflate, and
the airbag body inflates and deploys downward by generation of the gas so as to cover the side window portion on a vehicle interior side;
wherein:
the airbag body includes:
 a gas introduction portion for introducing the gas into the airbag body,
 a main passage portion communicating with the gas introduction portion for distributing the gas, and
 a plurality of chambers communicating with the main passage portion;
wherein:
the airbag body includes:
 a front inflating portion formed by at least one of the chambers and being inflatable and deployable so as to correspond to a position of the side window portion on a front side of the vehicle body, and
 a rear inflating portion formed by at least one of the chambers and being inflatable and deployable so as to correspond to a position of the side window portion on a rear side of the vehicle body;
wherein:
at least one of the chambers disposed at a lower end portion of the airbag body is provided with a bend-facilitating portion composed of a non-inflating portion of the airbag body and facilitating bending of the airbag body during inflation and deployment of the airbag body,
the bend-facilitating portion is disposed so as to correspond to a position between front and rear end portions of the side window portion on the rear side in a front and rear direction of the vehicle body,
the at least one of the chambers including the bend-facilitating portion includes a passage for distributing the gas such that the gas comes around the bend-facilitating portion in one direction,
the at least one of the chambers disposed at the lower end portion and including the bend-facilitating portion communicates, via a throttle portion, with another chamber adjacent to the at least one of the chambers, and
the bend-facilitating portion is disposed below the throttle portion of the other chamber in an up and down direction of a vehicle.

6. The curtain airbag device according to claim 5, wherein the at least one of the chambers including the bend-facilitating portion includes a lower end disposed so that a portion of the lower end which extends toward the throttle portion from the bend-facilitating portion serving as a boundary is positioned above the other portion of the lower end extending to a downstream side from the bend-facilitating portion.

* * * * *